United States Patent

[11] 3,610,638

[72] Inventor John Castagna
Brooklyn, N.Y.
[21] Appl. No. 854,513
[22] Filed Sept. 2, 1969
[45] Patented Oct. 5, 1971
[73] Assignee Creative Training, Inc.
New York, N.Y.

[54] TONE ARM POSITIONING MEANS
6 Claims, 6 Drawing Figs.

[52] U.S. Cl. ........ 274/14
[51] Int. Cl. ........ G11b 17/06, G11d 3/06
[50] Field of Search ........ 274/14, 13, 15, 23, 1

[56] References Cited
UNITED STATES PATENTS

| | | | |
|---|---|---|---|
| 2,972,483 | 2/1961 | Rodgers ........ | 274/14 X |
| 3,086,297 | 4/1963 | Kay ........ | 274/14 X |
| 3,500,551 | 3/1970 | Polewski ........ | 274/14 |

*Primary Examiner*—Harry N. Haroian
*Attorneys*—Mark T. Basseches and Paula T. Basseches

ABSTRACT: A phonograph is provided with manually operable indexing lever to directly move the tone arm so that the pickup stylus, when lowered to engage a disk record, contacts same at a preselected location determined by the cooperation of the lever with a notched indexing ridge.

BY

TONE ARM POSITIONING MEANS

This invention relates to phonographs in general and more particularly to a phonograph having novel means for manually operating the tone arm so that the pickup stylus engages preselected locations of the phonograph record.

Especially for educational purposes, it has been found desirable to provide an inexpensive phonograph having means permitting a child or other unskilled person to move the pickup stylus to a preselected location on the phonograph record. This capability is desirable in connection with the playing of multimessage phonograph records in which the messages are on concentric areas of the phonograph records, and are separated from one another by a land area which is not grooved except for a lead-in groove which directs a pickup stylus to the beginning of the message spiral area located inboard of the land area. There is a lock groove at the end of each message area to halt inward travel of the pickup stylus before it reaches the lead-in groove for the next message area.

In order to accurately lower the pickup stylus onto the land area preceding the desired message are, the instant invention provides a lever carried cam groove of V-shaped cross section which cooperates with a pointed follower projecting downward from the tone arm. As the lever is lifted, after the follower bottoms in the V-shaped cam groove, the stylus is lifted to a position above the record surface. Thereafter, movement of the lever in a plane generally parallel to the record surface causes related movement of the pickup stylus in a plane generally parallel to the record in a position thereabove. By moving the lever to a point where an indexing formation thereof enters a selected indexing slot, the pickup stylus is positioned so that upon lowering of the tone arm the stylus will engage the land area in front of the selected message area. Before the lever bottoms in the indexing slot, the stylus engages the phonograph record, with further travel of the lever into the indexing groove allowing the cam follower to clear the bottom of the cam groove to permit lateral movement of the tone arm while the lever remains stationary. The cross section of the cam groove and its location permit the follower to remain in the groove while an entire message is being played, yet during playback, the indexing means exercises no physical restraint on the tone arm. HOwever, at the end of the message, when the lever is lifted, the follower automatically moves to the bottom of the cam groove, so that the pickup stylus will be accurately positioned in accordance with the indexing slot next selected.

Accordingly, a primary object of the instant invention is to provide a phonograph having novel means for locating the pickup stylus at a preselected location on the record.

Another object is to provide an inexpensive means for locating a selected message on a multimessage phonograph record.

Still another object is to provide a phonograph having means to permit an unskilled person to selectively position the pickup stylus.

A still further object is to provide a phonograph in which the tone arm is manually operated under the control of an indexing lever so constructed that there is a limited degree of lost motion between the lever and tone arm, permitting an entire message to be played and enabling the lever to automatically engage and move the tone arm, at the conclusion of a message playback, to the beginning of the same or a different message.

A still further object is to provide a phonograph with an indexing lever to selectively position the pickup stylus and with means to readily disconnect the indexing lever from the tone arm to permit the phonograph to play a conventional record. These objects as well as further objects of the instant invention will become readily apparent after reading the following description of the accompanying drawing, in which.

Figures 1, 2, 2A, 3, 3A:
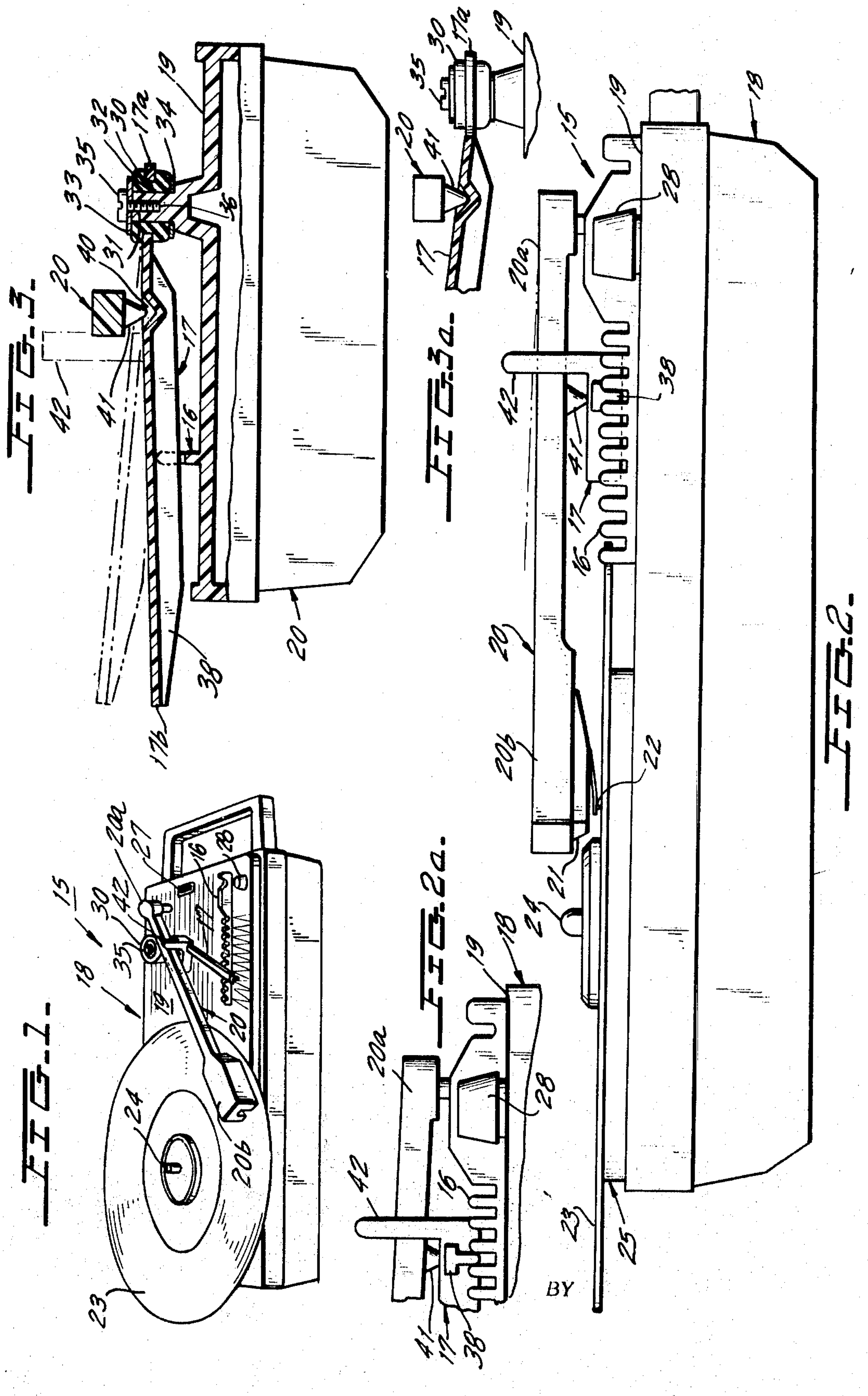
FIG. 1 is a perspective of a phonograph including the novel tone arm positioning means of the instant invention.
FIG. 2 is a side elevation of the phonograph of FIG. 1, looking in the direction of arrows 2—2 of FIG. 1.

FIG. 2*a* is a fragmentary portion of FIG. 2, with the indexing lever shown entering an indexing slot.

Figure 4:
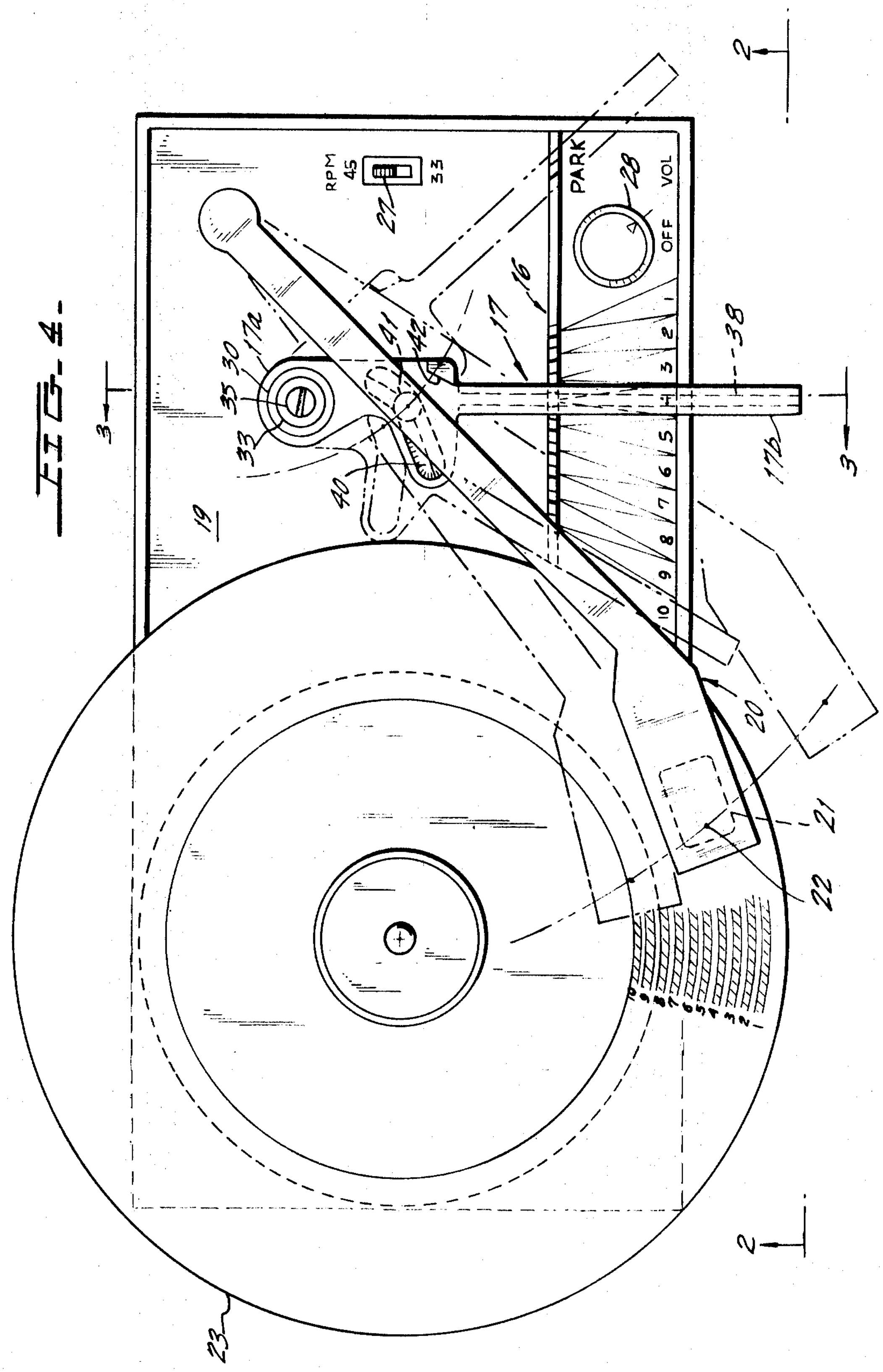

FIG. 3 is a cross section taken through line 3—3 of FIG. 4, looking in the direction of arrows 3—3.

FIG. 3*a* is a fragmentary portion of FIG. 3, with the indexing lever lifted to a position wherein the follower on the tone arm is bottomed in the cam groove.

FIG. 4 is a plan view of the phonograph of FIG. 1.

Now referring to the FIGS. Phonograph of 15 is generally of conventional construction, with the addition of indexing ridge 16 and indexing lever 17. Constructional and operational details of elements 16 and 17 will be hereinafter explained.

Phonograph 15 includes housing 18, having generally horizontal raised baseplate 19 whereon tone arm 20 is mounted at end 20*a* thereof, in a conventional manner, for pivotal movement toward and away from base 19, as well as for movement parallel to base 19. Transducer or pickup 21 is mounted to tone arm 20 at the free end 20*b* thereof and includes stylus 22 which rides in the grooves of disk phonograph record 23 so as to be driven in accordance with signals recorded in the record sound grooves. Record 23 is supported on the upper surface of turn table 25 in a position concentric with spindle 24 which serves as a central axis about which turntable 25 rotates in a generally horizontal plane.

Selector switch 27, accessible at the upper surface of base 19, operates a conventional mechanism (not shown) within housing 18 for controlling the rotational speed of turntable 25. Combined on-off and volume control 28, also accessible at the upper surface of base 19, controls operation of an amplifier (not shown) disposed within housing 18, such amplifier receiving signals from pickup 21 and converting such signals to drive a loudspeaker (not shown), also disposed within housing 18.

Indexing ridge 16 is a flat elongated member secured along one of its edges to base 19 and projecting upward therefrom. For a reason to be hereinafter explained, the upper or free edge of indexing ridge 16 is provided with notches designated "PARK" and "1–100" inclusive (FIG. 4). Indexing lever 17 is an elongated member pivotally mounted at end 17*a* thereof. This pivotal mounting includes vertical post 31 formed integrally with and extending upward from base 19. Flexible grommet or bushing 30, surrounding post 31, extends through aperture 32 in lever 17, with flat washers 33, 34 positioned adjacent to the top and bottom respectively of bushing 30. Screw 35 extends through upper washer 33, and is received by a threaded central depression 36 in the upper surface of post 31. With screw 35 tightened to a point where upper washer 33 abuts the upper end of post 31, bushing 30 is compressed to exert a force urging the free end 17*b* of lever 17 downward toward base 19.

The portion of lever 17 from end 176 thereof to bushing aperture 32 is of T-shaped cross section, with the vertically extending leg 38 thereof being proportioned to closely fit into the slots extending downward from the free upper edge of indexing ridge 16. These indexing slots are designated "PARK" and "1–10," respectively, when moving from right to left with respect to FIG. 4. It is noted that the indicia "PARK" and "1–10" appear directly on the upper surface of base plate 19, and in the case of numerals 1–10 each is associated with an arrowhead type direction indicator pointing to a particular one of the slots.

Each of the slots 1–10 is related to each of the areas designated 1–10 on record 23. In particular, record 23 is of a type having individual messages recorded thereon in concentric positions. There is a relatively extensive land area containing a lead-in groove at the beginning of each message area, and the multiturn spiral sound groove terminates in a lock groove which prevents the pickup stylus 22 from automatically proceeding from message to message.

At a point on lever 17, located between its mounting and 17*a* and the points where lever 17 engages ridge 16, lever 17 is provided with a curved cam groove 40. As best seen in FIG. 3, cam groove 40 is of V-shaped cross section, with the mouth of the V being at the upper surface of lever 17. Cam groove 40 is adapted to receive conical cam follower 41, which is carried by tone arm 20 and extends downward from the bottom surface thereof. Post 42, extending upward from lever 17, is operatively positioned so that by moving tone arm 20 against post 42, follower 41 is positioned to enter cam groove 40 when arm 20 is released.

Phonograph 15 is intended to be operated by an unskilled person, who may select a particular message recorded on record 23. Such selection may be identified by a color code or a number corresponding to 1–10, the colors in question being applied to the triangular pointers associated with the slot identifying numbers. For example, if message No. 8 is selected and lever 17 is at the message No. 4 position of FIG. 4, indexing lever 17 is raised against the downward biasing force provided by bushing 30 until indexing formation 38 is above and clear of indexing ridge 16. Then lever 17 is pivoted in a clockwise direction, with respect to FIG. 4, until indexing formation 38 is aligned with slot 8 of indexing ridge 16. During this movement of lever 17, cam slot 40 in cooperation with follower 41 drives tone arm 20 in a clockwise direction with respect to FIG. 4. As indexing formation 38 moves downward into slot 8 of indexing ridge 16, pickup stylus 22 is lowered onto the land area containing the lead-in groove for message area 8 on record 23.

As message 8 on record 23 is being played, tone arm 20 pivots further in a clockwise direction. However, during this period of time, lever 17 remains stationary. This relative movement between tone arm 20 and lever 17 is permitted because of the fact that lever 17 does not reach its lowermost position until after stylus 22 engages record 23. Thus, during the period when pickup 21 is transducing signals from record 23 constituting message 8, the bottom of cam follower 41 moves free of cam 40, even though positioned slightly below the upper surface of lever 17. This mode of operation may take place due to the fact that stylus 22 is approximately three times the distance from the tone arm pivot that follower 41 is. Thus, when tone arm 20 is pivoted in a horizontal plane, stylus 22 moves approximately three times as far as follower 41. The lock groove at the end of message 8 prevents follower 41 from moving beyond the confines of cam slots 40.

After selection of another message or selected repeat play of the same message 8, indexing formation 38 is lifted above the free edge of indexing ridge 16. During this movement, the slanted walls of cam groove 40 guide the tip of follower 40 to a bottomed or centered position in groove 40. Thus, when indexing formation 38 is moved to and lowered into the next desired slot of indexing ridge 16, stylus 22 will be lowered automatically to engage the land area of record 23 containing the lead-in groove for the message correlated with the slot having formation 38 entered therein.

When it is desired to play a conventional record having a single continuous sound groove, indexing lever 17 is moved to the park slot. Tone arm 20 is then lifted to move follower 41 clear of cam groove 40, after which tone arm 20 is pivoted clockwise until stylus 22 engages the peripheral land area of the record on turntable 25. For this position of stylus 22, follower 41 is positioned clockwise of cam groove 40, so that movement of stylus 222 across the record will not be impeded by lever 17. The subsequent location of follower 41 in cam groove 40 is facilitated by post 42 which is so placed that with lever 17 in the PARK or any other position, by moving the tone arm 20 into abutment with post 42 follower 41 is aligned over cam groove 40.

While the specific embodiment illustrated in the drawings is particularly adapted for the playback of messages from a multimessage record having a lock groove at the end of each message area, by modifying the shape of the cam groove or by lowering the cam groove during playback to a position wherein the lower end of the cam follower is completely outside of the cam groove, indexing lever 17 may be utilized to move stylus 22 to a selected position on a conventional record and playback of such record will take place from this selected position to the end of the recording, with the end of the recording being so positioned that the follower will be outside of the cam groove when the stylus is at the end of the recording.

Thus, it is seen that the instant invention provides a relatively inexpensive apparatus which may be operated by an unskilled person to quickly move a pickup stylus to a selected position on a disk record. While a complete phonograph embodying the instant invention has hereinbefore been described, it is noted that a conventional phonograph may readily be modified to incorporate this invention. Such modification consists of adding the equivalents of indexing ridge 16, cam means 40, 41 and lever 17 together with its combined mounting and biasing means.

Although there has been described a preferred embodiment of this novel invention, many variations and modifications will now be apparent to those skilled in the art. Therefore, this invention is to be limited not by the specific disclosure herein, but only by the appending claims.

The embodiments of the invention in which an exclusive privilege or property is claimed are defined as follows:

1. A playback unit including a base, a turntable supported on said base for rotation in a generally horizontal plane, a tone arm having one end thereof movably supported on said base on pivot and tilt axes, a transducer mounted to said arm at the other end thereof and positionable to pick up signals carried by a disk record supported on said turntable and rotatable therewith, a positioning arm mounted on said base for movement about pivot and tilt axes, index means on said base, locator means on said positioning arm adapted to be selectively engaged with said index means, thus to orient said positioning arm at a predetermined pivotal position relative to said base, said positioning arm being shiftable to clearing position of said index means responsive to movement of said arm about said tilt axis, complemental cam and follower members on said arms, said cam member comprising a recess having a wide mouth and converging sidewalls, and said follower comprising a projection, said cam and follower being positioned to introduce said projection into said recess through said wide mouth, thus to locate and connect said tone arm to said positioning arm responsive to movement of said positioning arm to said clearing position of said index means, and to release said tone arm for movement independent of said positioning arm when said positioning arm is engaged with said index means.

2. The playback unit of claim 1 wherein said recess comprises an elongated groove.

3. The playback unit of claim 1 and including biasing means yieldingly urging said locator means of said positioning arm into engagement with said index means.

4. The device of claim 1 wherein said recess is formed on an upwardly facing portion of said positioning arm and said projection is formed on an under surface of said tone arm.

5. The playback unit of claim 2 wherein said disk includes a plurality of unconnected annular bands adapted to be traced by said tone arm, the radial extent of said bands being of a limited size whereby portions of said projection are maintained in registry with portions of said recess at all positions of said tone arm on any one band.

6. A playback unit including a base, a turntable supported on said base for rotation in a generally horizontal plane, a tone arm having one end thereof movably supported on said base on pivot and tilt axes, a transducer mounted to said arm at the other end thereof and positionable to pick up signals carried by a disk record supported on said turntable and rotatable therewith, an elongated positioning member movably mounted on said base about pivot and tilt axes, indexing means on said base defining a plurality of slots, a stop on said positioning member selectively enterable into said slots, a cam formation on the upper surface of said positioning means comprising a groove having converging walls and a relatively wide, upwardly facing mouth portion, a follower on said tone arm closer to said one end than to said other end thereof, said follower being in driving engagement with said cam formation while said stop of said positioning member is cleared from said slots whereby movement of said positioning member about said pivot axis effects a pivoting of said arm, said driving connection being broken when said stop is engaged with said indexing means.